UNITED STATES PATENT OFFICE.

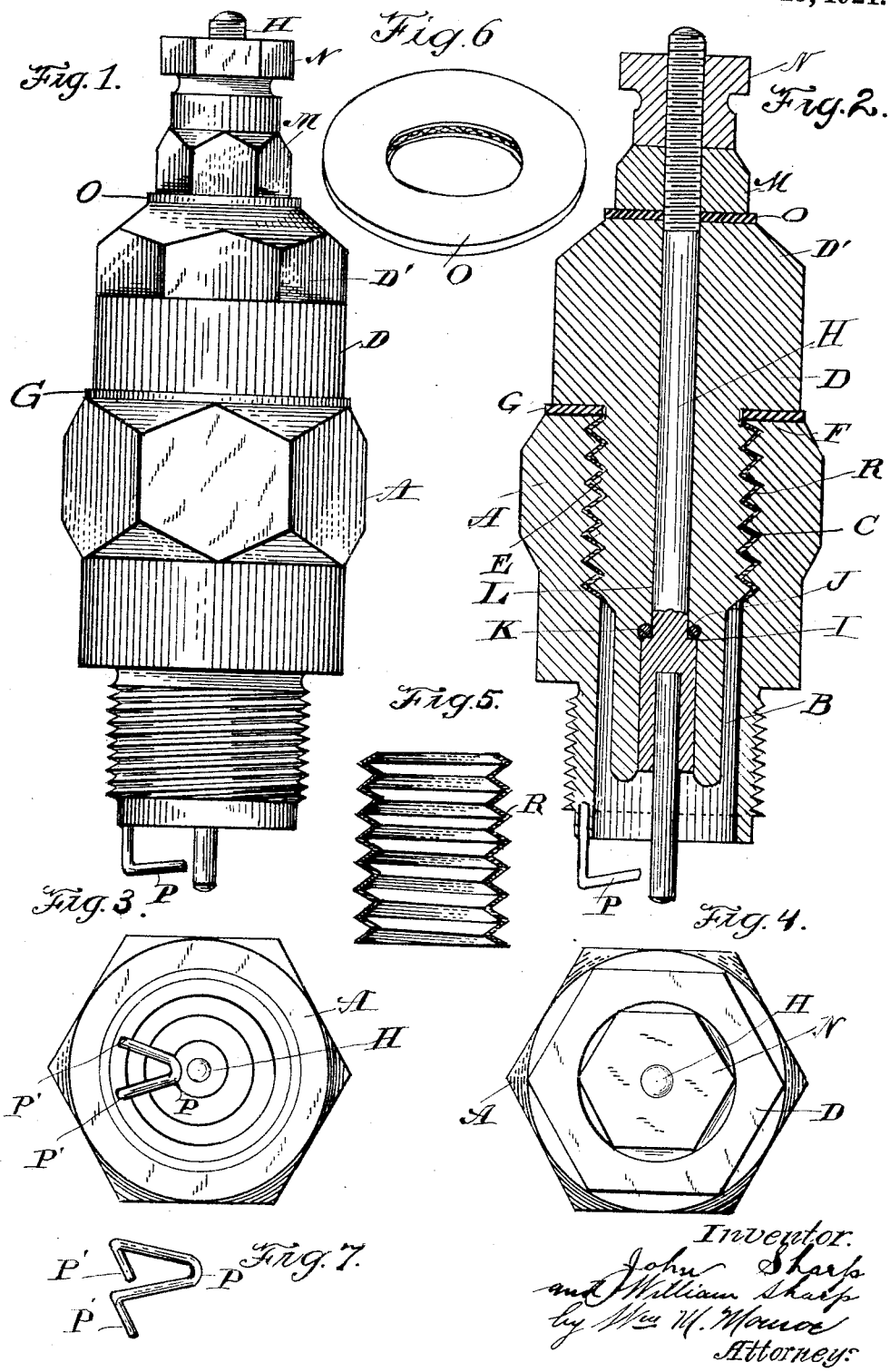

JOHN SHARP AND WILLIAM SHARP, OF CLEVELAND, OHIO.

SPARK-PLUG.

1,366,603.

Specification of Letters Patent.   Patented Jan. 25, 1921.

Application filed October 20, 1919.  Serial No. 331,799.

*To all whom it may concern:*

Be it known that we, JOHN SHARP and WILLIAM SHARP, citizens of the United States, and residents of Cleveland, in the county of Cuyahoga and State of Ohio, have invented certain new and useful Improvements in Spark-Plugs, of which we hereby declare the following to be a full, clear, and exact description, such as will enable others skilled in the art to which it appertains to make and use the same.

The objects of the invention are to provide an improved form of spark plug, so constructed as to save time and labor in manufacturing and assembling the parts.

In this device, a separate packing and holding nut or sleeve for retaining the central insulating core is dispensed with and the central insulating core is provided with integral attaching means preferably consisting of a coarse screw thread, each turn of which presents tapered shoulders which engage similar shoulders on the female screw in the body portion of the plug.

Each of these shoulders forms a seat that is gas proof when packing is interposed between the insulator and the said metal body.

This packing is also composed of a yielding and heat resisting substance or compound which not only prevents conduction of heat from the metal body to the central core but also yields to pressure and prevents the breakage of the insulating core due to the irregular expansion and contraction of the metal body and core, and different ratios of expansion of the two materials.

The central insulation is also provided with a hexagonal extremity permitting the use of a wrench to adjust it in place or to renew the part.

The ground terminal is also rigidly supported to prevent it from reducing or lengthening the spark gap.

The sparking terminals are also made of heat resisting and non magnetic metal such as nickel or nickel alloys which prevents the attraction of iron particles worn from the cylinder, from accumulating on the spark plugs, and shortening the length of the spark gap.

The invention is illustrated in the accompanying drawings, hereinafter described and specifically pointed out in the claims.

In the accompanying drawings Figure 1 is a side elevation of the device, Fig. 2 is a central longitudinal section of the device, Fig. 3 is a bottom view thereof, Fig. 4 is a top view thereof, Fig. 5 is a longitudinal section of the insulating sheet shown in Fig. 2, Fig. 6 is a perspective of one of the packing washers shown in Fig. 2, Fig. 7 is a perspective of a wire terminal.

In these views A is the metal body of the spark plug provided with a central opening B, the upper portion of which is internally screw threaded at C.

Within this opening is screwed the central insulating core D the lower end of which is screw threaded at E for vertical adjustment in said metal body.

A shoulder F upon the central insulation is tightly pressed against a resilient washer G which is clamped between said shoulder and the upper surface of said body.

The screw thread of the insulation is machined a little scant in diameter so as to leave a clear annular space between the inner and outer threads, and a sheet R of heat resisting substance similar to asbestos can be interposed between the inner and outer screw threads and will be tightly clamped between the opposed sides of the threads, thus preventing the transmission of heat from the metal to the core and also forming a packing which prevents gas escaping. This sheet is also resilient to yield to pressure and to prevent the core from breaking when the parts irregularly expand and contact, and to protect the insulator D when it is tightly screwed into place.

The central electrode H is provided with a shoulder I which engages a shoulder J in the core and a yielding washer K prevents the passage of gas through the central opening L through which the electrode passes.

The ordinary clamping and lock nuts M and N for this electrode are shown and a packing washer O between the central insulation and the clamping nut prevents leakage of gas.

The ground terminal P is preferably braced so that it can not revolve by means of two extremities P', P', which are inserted at spaced points in the metal body.

Having described the invention, what we claim as new and desire to secure by Letters Patent is:

1. In a spark plug, a metal body having a central screw threaded opening, a central insulation provided with a screw threaded extremity, adjustable in said screw threaded opening, and a sheet of resilient and heat resisting material interposed between said screw threaded portions of said metal body and central insulation.

2. In a spark plug, a metal body provided with a central screw threaded opening, a central insulation having an externally screw threaded inner extremity adjustable in said screw threaded opening in said body, the diameter of said central insulation being less than the diameter of said opening in said metal body, providing an annular space and a packing sheet of resilient and heat resisting material interposed between said insulation and metal body, in said annular space.

3. In a spark plug, a metal body having a screw threaded opening, a central insulation, having a corresponding screw threaded portion of less diameter than said screw threaded opening, a packing of resilient and heat resisting material inserted between the screw threaded portions of said metal body and central insulation, and said central insulation having a shoulder, and a resilient washer interposed between said shoulder and said metal body.

In testimony whereof we hereunto set our hands this 15" day of October, 1919.

JOHN SHARP.
WILLIAM SHARP.

In presence of—
S. W. SANGSTER,
WM. M. MONROE.